Nov. 12, 1940.　　　J. H. KOHLER　　　2,220,965
SEAL
Filed May 4, 1938　　　2 Sheets-Sheet 1
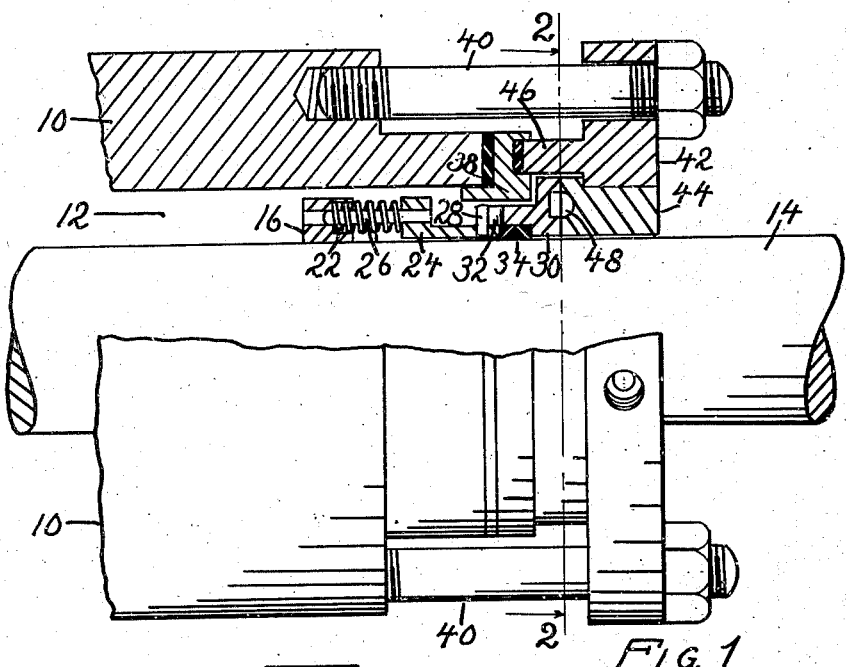
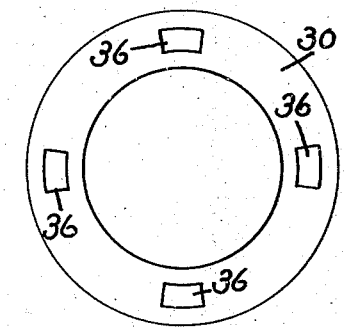
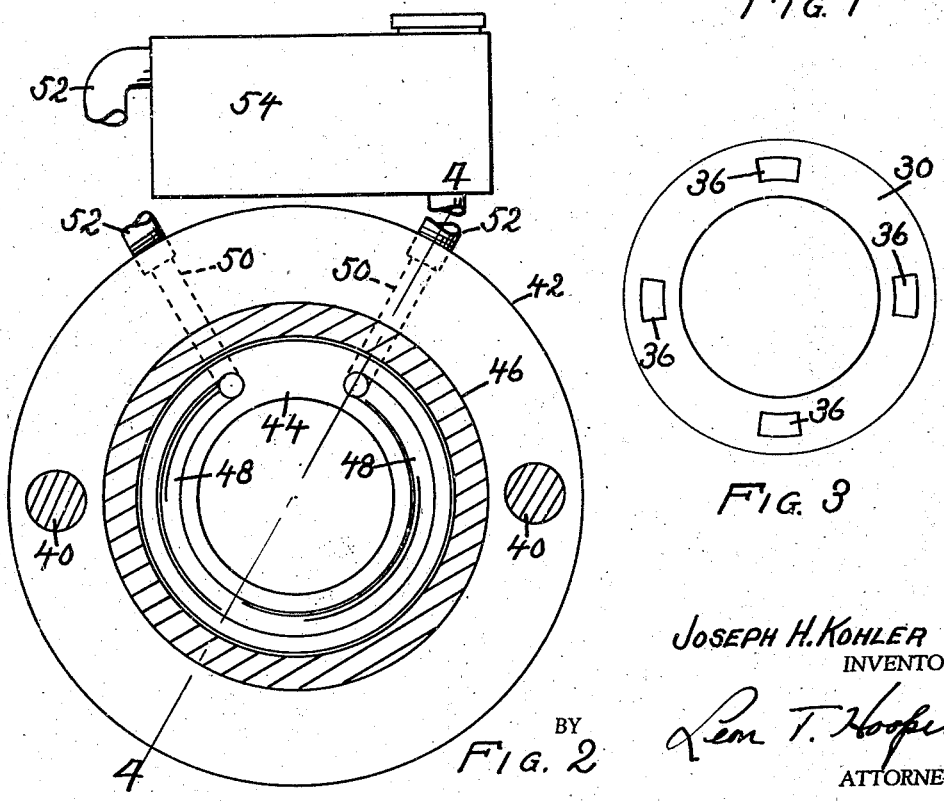
Joseph H. Kohler
INVENTOR.
BY Leon T. Hooper
ATTORNEY.

Nov. 12, 1940.   J. H. KOHLER   2,220,965
SEAL
Filed May 4, 1938   2 Sheets-Sheet 2

Joseph H. Kohler
INVENTOR.
BY
ATTORNEY.

Patented Nov. 12, 1940

2,220,965

UNITED STATES PATENT OFFICE 2,220,965

SEAL

Joseph H. Kohler, Calumet City, Ill.

Application May 4, 1938, Serial No. 205,892

4 Claims. (Cl. 286—8)

This invention relates to an improved seal which is especially adapted for use in conjunction with centrifugal pumps, valves, and the like. However, it will be apparent from the following detailed description that the usefulness of the improved seal of this invention is by no means confined to such employment.

The improved seal of this invention is of the general type disclosed in my prior application for patent, Serial No. 45,171, which matured into Patent No. 2,112,461, dated March 21, 1938.

One of the principal objects of the improved device resides in the provision of means for economically producing a sturdy and efficient seal which is practically indestructible.

Another and still further object of importance and advantage resides in the provision of means for employing the improved device on pumps or the like without altering or changing in any manner the casing or stuffing boxes of the pump.

Still another and further object of importance is the provision of means for employing, as an element of the improved seal, a sealing ring having a greater diameter than the diameter of the interior of the stuffing box.

Another important object of the improved seal of this invention is the fact that it may be attached to the present type pumps having either split or sleeve bearings.

An additional object of importance and advantage is the self-contained means for circulating a continuous flow of lubricant over the bearing surfaces of the sealing members.

Additional objects of importance and advantage will become apparent as the following detailed description progresses, reference being had to the accompanying drawings, wherein Fig. 1 is a top plan view of a shaft seal of the improved device of this invention, parts thereof being broken away.

Fig. 2 is a vertical section taken on line 2—2 of Fig. 1, looking in the direction indicated by the arrows.

Fig. 3 is a front elevational view of the annular sealing member.

As shown in the drawings:

Figure 5:
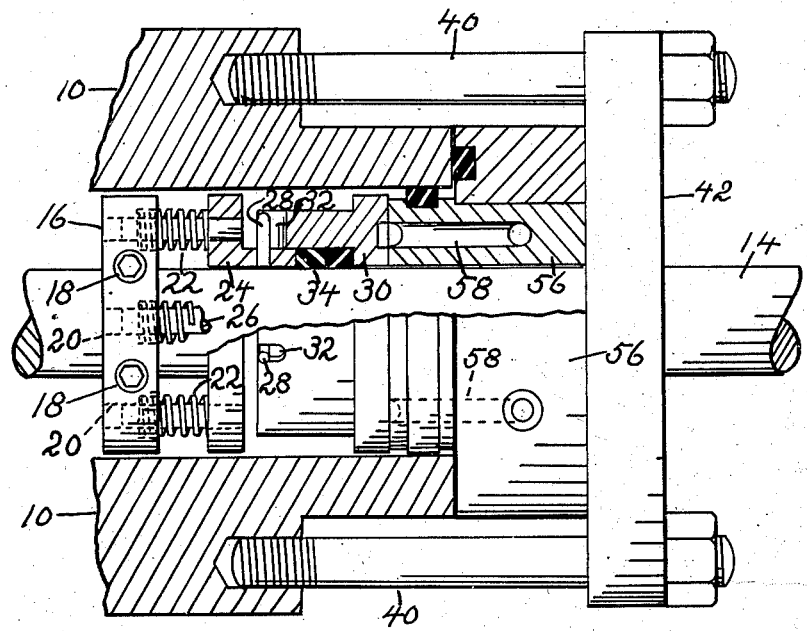
Fig. 5 is a top plan view of a slightly modified form of the improved seal in working position, shown partly in section.
Figures 4, 6:
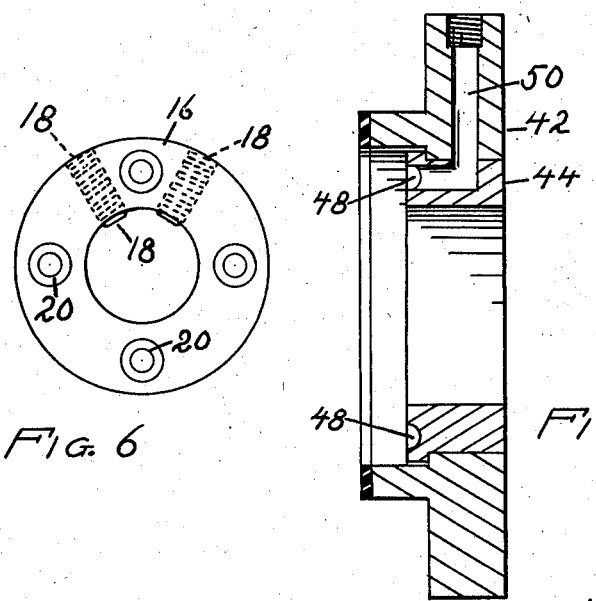
Fig. 4 is a vertical section taken on line 4—4 of Fig. 2.
Fig. 6 is a front elevational view of the annular locking member.

The reference numeral 10 indicates generally a more or less conventional pump casing having a stuffing box aperture formed in the end thereof.

Extending through the stuffing box aperture 12 is a shaft 14 to which a portion of the improved seal of this invention is secured.

Secured to the portion of the shaft within the stuffing box 12 is an annular locking member 16. The locking member 16 is preferably secured to the shaft by means of set screws 18. However, it will be apparent that any other suitable means may be employed for securing the two parts together.

The locking member 16 is provided with a plurality of countersunk apertures 20, each of which is adapted to receive the end of a helical spring 22.

Slidably positioned on the shaft 14 and rotatable therewith is an annular element 24 which has a plurality of pins 26 extending into the countersunk apertures 20. Projecting outwardly from a restricted portion of the peripheral surface of the annular element 24 is a plurality of studs 28.

Positioned on the shaft 14 and in telescoping engagement with the annular element 24 is an annular sealing member 30. The annular sealing member is provided with a plurality of slots 32 which are in sliding engagement with the studs 28. The annular element 24 and the sealing member 30 are slidable longitudinally of the shaft. Positioned on the shaft 14 intermediate the annular element 24 and the sealing member 30 is a packing element 34, as is best shown in Figs. 1 and 5. It will be apparent from the foregoing that the rotative movement of the shaft 14 and the locking member 16 is imparted to the annular element 24 and the sealing member 30. In addition to the members rotating with the shaft, a force is exerted against the annular element 24 by the springs 22 urging it away from the locking member 16.

Formed in the working surface of the annular sealing member 30 is a plurality of segmentally-shaped recesses 36. As the member 30 rotates the recesses 36 are adapted to convey oil to the bearing surfaces of the engaged surfaces of the sealing member.

In the preferred construction of the invention, a spacing member 38 is positioned at the end of the casing 10. The spacing member 38 is provided with an annular shoulder, which is best shown in Fig. 1, and which extends into the stuffing box 12. The opposite face of the spacing member 38 is provided with an annular groove, which is clearly shown in Fig. 1.

Secured to the end of the casing 10 by bolts 40 is a gland 42. The gland 42 is centrally apertured to receive a sealing element 44. The sealing element may be readily replaced when it becomes necessary without disturbing or removing the entire seal from the shaft. Moreover, this construction allows the sealing members 44 or 30 to be replaced at a minimum expense.

Formed on the inner surface of the gland 42 is an annular shoulder 46 which is adapted to enter the groove in the spacing member 38 and be secured thereto, as is best shown in Fig. 1. A gasket member as shown is preferably positioned on each side of the spacing member 38. It is to be observed that the sealing surfaces of the members 30 and 44, as shown in the preferred embodiment in Fig. 1 may be of greater diameter than the diameter of the interior of the stuffing box 12.

Formed in the working surface of the sealing element 44 is a segmental groove 48. A passageway 50 extends from each end of the segmental groove 48 through a portion of the gland 42 and thence outwardly to the peripheral edge thereof. It will be apparent that the passageway 50 and the segmental groove 48, when the device is assembled, provide a passageway for conveying a lubricant to the working faces of the sealing members 30 and 44.

Secured in the outer end of each passageway 20 is a pipe 52 which connects the passageway with an oil reservoir 54. The oil reservoir may be drained or refilled as desired.

In the modified form of the device as shown in Fig. 5, the gland 42 is preferably a separate and more or less conventional member. In this construction the oil passageways 50 are located in the intermediate members 56 and, in turn, connect with the passageways 58 to supply a lubricant to the working faces of the sealing member.

In both the preferred and modified form of the invention, as shown in the drawings, the segmental recesses 36 form essential elements thereof. These recesses 36 are of the same diameter and radius as the groove 48 and consequently follow the grove 48 as the sealing member 30 rotates. It is apparent therefore that oil entering the groove also enters the moving recesses and as each recess arrives at the end of the groove, the oil therein is forced upwardly through the passageway 50 into the reservoir.

This construction provides substantially a centrifugal pump. When the device is in operation, oil is drawn from the reservoir 54 through one of the passageways 50 into the groove 48 and the recesses 36, thus lubricating the working faces of the sealing members 30 and 44. The circulating of the oil continues upwardly through the other passageway 50 through the pipe 52 to the reservoir 54. This forced circulation continues as long as the seal is in operation. Oil in the reservoir may be replenished or changed as desired.

It will be apparent from the foregoing that herein is provided an efficient and economically operated seal which includes a self-contained forced feed lubricating system.

Moreover, the forced lubricating system is entirely automatic in that the circulation of oil starts and stops with the starting and stopping of the device.

It will be apparent to those skilled in the art to which the improved device of this invention appertains, that numerous changes in construction and design may be made, all without departing from the spirit or scope of the invention. Accordingly, it is understood that the patent granted hereon is not to be limited except as necessitated by the terminology of the appended claims when given a range of equivalents to which they may be entitled.

I claim as my invention:

1. The combination with a rotatable shaft, a casing having a stuffing box through which said shaft extends, a locking ring positioned on said shaft and secured thereto, an annular element positioned on said shaft and movable longitudinally thereof, said locking ring and said annular element being in spaced relation but joined for rotation in unison, spring means urging said annular element and said locking ring apart, a sealing member positioned on the shaft and in telescoped relation with said annular element, said sealing member and said annular element being connected for positive rotative but independent longitudinal movement, a gland having a sealing surface in engagement with the sealing surface of said sealing member, said gland being secured to said casing, and automatic means for circulating a lubricant through said gland, said means including a pair of passageways extending through said gland to the sealing surface thereof, said passageways opening onto the sealing surface of said gland at spaced apart points, a segmental groove concentric with said gland extending from one of said passageway openings to the other, and a plurality of impeller recesses in the sealing surface of said sealing member, said impeller recesses being positioned to operate in opposed relation to the entire segmental groove over which it travels.

2. In a seal including a revolvable sealing member and a stationary sealing member in opposed relation one to the other, an oil passageway extending into and out of said stationary sealing member, said passageway including a groove in the face of said stationary sealing member, and a plurality of impeller recesses in the face of said revolvable sealing member coacting with said groove to provide means for circulating oil through said oil passageway and out of said sealing member.

3. In a seal including a revolvable sealing member and a stationary sealing member in sealing contact one with the other, said stationary sealing member having an inlet passageway and an outlet passageway extending from atmosphere to the sealing surface thereof, and coacting means formed in the sealing surfaces of said sealing members for collecting oil from said inlet and expelling the oil through said outlet passageway, said co-acting means comprising a plurality of impeller recesses positioned in spaced relation in the face of one sealing member and a segmental groove formed in the face of the opposed sealing member, said impeller recesses being positioned to operate in opposed relation to said segmental groove, the radii of said segmental groove and said impeller recesses being equal.

4. In a shaft seal including a stationary sealing member and a revolvable sealing member in sealing engagement, an oil reservoir having an inlet passageway leading to said sealing surfaces and an outlet passageway leading from said sealing surfaces, and means for circulating oil through said passageways, said means comprising an oil groove in said stationary member and a plurality of impeller recesses formed in the face of the revolvable member.

JOSEPH H. KOHLER.